US012670551B2

(12) United States Patent (10) Patent No.: US 12,670,551 B2
Wolff et al. (45) Date of Patent: Jun. 30, 2026

(54) MICROSCOPY SYSTEM AND METHOD FOR REDUCING AN IMAGE VIGNETTING

(71) Applicant: Carl Zeiss Microscopy GmbH, Jena (DE)

(72) Inventors: Horst Wolff, Siegsdorf (DE); Rebecca Elsaesser, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 515 days.

(21) Appl. No.: 18/083,031

(22) Filed: Dec. 16, 2022

(65) Prior Publication Data

US 2023/0196533 A1 Jun. 22, 2023

(30) Foreign Application Priority Data

Dec. 20, 2021 (DE) ..................... 10 2021 133 867.0

(51) Int. Cl.
*G06T 5/50* (2006.01)
*G02B 21/36* (2006.01)
(Continued)

(52) U.S. Cl.
CPC .............. *G06T 5/50* (2013.01); *G02B 21/367* (2013.01); *G06T 5/70* (2024.01); *G06T 5/77* (2024.01);
(Continued)

(58) Field of Classification Search
CPC ............. G06T 5/50; G06T 2207/20221; G06T 2207/10056; G06T 2207/20081;
(Continued)

(56) References Cited

U.S. PATENT DOCUMENTS

2007/0211154 A1    9/2007  Mahmoud et al.
2011/0116694 A1    5/2011  Gareau
(Continued)

FOREIGN PATENT DOCUMENTS

CN        113570504 A    10/2021
DE    102018115991 A1    1/2020
(Continued)

OTHER PUBLICATIONS

Piccinini, Filippo, Bevilacqua, Alessandro, Colour Vignetting Correction for Microscopy Image Mosaics Used for Quantitative Analyses, BioMed Research International, 2018, 7082154, 15 pages, 2018. https://doi.org/10.1155/2018/7082154 (Year: 2018).*
(Continued)

*Primary Examiner* — Utpal D Shah
*Assistant Examiner* — Jack Peter Kraynak
(74) *Attorney, Agent, or Firm* — LaBatt, LLC

(57) ABSTRACT

In a method for reducing an image vignetting, a microscope image is captured by means of a microscope, wherein the microscope image exhibits a vignetting. At least the microscope image is input into an image processing model which has been trained, by means of training data comprising input images with vignetting and associated target images without vignetting, to calculate a vignetting-free microscope image from at least the input microscope image. The method further comprises the outputting of a calculated vignetting-free microscope image by the image processing model.

20 Claims, 9 Drawing Sheets

(51) Int. Cl.

| | |
|---|---|
| *G06T 5/70* | (2024.01) |
| *G06T 5/77* | (2024.01) |

(52) U.S. Cl.

CPC ............... *G06T 2207/10056* (2013.01); *G06T 2207/20081* (2013.01)

(58) Field of Classification Search

CPC ... G06T 2207/20084; G06T 5/60; G06T 5/77; G06T 5/70; G02B 21/367; G02B 21/365

See application file for complete search history.

(56) References Cited

U.S. PATENT DOCUMENTS

| | | | | |
|---|---|---|---|---|
| 2020/0357096 | A1* | 11/2020 | Gao | G06T 5/70 |
| 2021/0097661 | A1* | 4/2021 | Palo | G06N 3/045 |
| 2021/0232863 | A1* | 7/2021 | Seo | G06N 3/0464 |
| 2022/0051373 | A1* | 2/2022 | Kappel | G06N 3/0464 |
| 2022/0138573 | A1* | 5/2022 | Serra Lleti | G06N 7/01 |
| | | | | 706/15 |
| 2022/0222822 | A1* | 7/2022 | Amthor | G06T 5/70 |

FOREIGN PATENT DOCUMENTS

| | | | |
|---|---|---|---|
| DE | 102018222147 | A1 | 6/2020 |
| EP | 2318875 | B1 | 5/2011 |

OTHER PUBLICATIONS

Fang Zhao, Lanxin Zhu, Chunyu Fang, Tingting Yu, Dan Zhu, and Peng Fei, "Deep-learning super-resolution light-sheet add-on microscopy (Deep-SLAM) for easy isotropic volumetric imaging of large biological specimens," Biomed. Opt. Express 11, 7273-7285 (2020) (Year: 2020).*

Weigert, M., Schmidt, U., Boothe, T., Müller, A., Dibrov, A., Jain, A., . . . & Myers, E. W. (2018). Content-aware image restoration: pushing the limits of fluorescence microscopy. Nature methods, 15(12), 1090-1097. (Year: 2018).*

Weigert et al., "Content-Aware Image Restoration: Pushing the Limits of Fluorescence Microscopy," Dec. 19, 2017 bioRxiv 236463; https://doi.org/10.1101/236463, 16 pages.

Label-free Determination, Allen Cell Explorer, https://www.allencell.org/label-free-determination.html, printed Feb. 21, 2021, 6 pages.

Vignetting correction, Scientific Volume Imaging, https://svi.nl/Vignetting, printed Feb. 20, 2021, 3 pages.

New ace features, Basler, https://www.baslerweb.com/en/products/cameras/area-scan-cameras/ace/, printed on Feb. 20, 2021, 8 pages.

* cited by examiner

MICROSCOPY SYSTEM AND METHOD FOR REDUCING AN IMAGE VIGNETTING

REFERENCE TO RELATED APPLICATIONS

The current application claims the benefit of German Patent Application No. 10 2021 133 867.0, filed on 20 Dec. 2021, which is hereby incorporated by reference.

FIELD OF THE DISCLOSURE

The present disclosure relates to a microscopy system and a method for reducing an image vignetting.

BACKGROUND OF THE DISCLOSURE

Depending on the setup, the capture of microscope images can entail a vignetting, i.e. a shading of one or more edges in the captured images. If an employed camera sensor is larger than the area homogeneously illuminated by the optical system of the microscope, the image brightness drops off towards the edges.

Microscope images with vignetting can be cropped so that only a homogeneously illuminated central area is utilized; cropping, however, results in the loss of captured information. An adjustment of the illuminated cross-sectional area of the optical system to the size of the camera sensor, on the other hand, is not always possible or viable. Moreover, camera sensors are often rectangular while optics are often circular so that an exact adjustment of the illuminated cross-sectional area to the camera sensor is also not feasible on this account. Vignetting can also occur in scanning systems when a scanning light beam hits a sample at different angles.

Vignetting models, which remove the vignetting from the microscope image computationally and, to this end, take into account optical properties of the imaging optic and the size of the camera sensor, are frequently employed in the prior art in order to be able to use the image information in shaded edge areas, i.e., darker outer areas. Edge areas are in particular brightened by this means. Alternatively, image processing filters are also used which brighten the edge areas of captured images without properties or settings of the microscope being taken into account in the image processing filter. For example, EP 2 318 875 B1, in particular paragraphs [0094] and [100], as well as US 2007/0211154 A1, describe fitting a polynomial correction function for a brightness adjustment to images of a reference sample in order to subsequently compensate a vignetting in images. A further compensation of a vignetting through multiplication of the pixel values of an image by a correction function determined in advance is described in DE 10 2018 115 991 A1.

If there is a large discrepancy between a homogeneously illuminated central image area and a shaded edge area, however, structures in the edge area disappear almost entirely. In particular in such cases, a simple filtering or brightening is inadequate. This is because, among other things, an image quality is not improved by brightening; instead, the image noise in the edge area remains high while the signal-to-noise ratio (SNR) in the edge area remains poorer than in the central image area. Other image defects in the edge area, such as color defects, also remain.

In cases of a change in the magnification and apertures of the microscopy system, for example in the case of an objective change or an Optovar change (i.e. a change in magnification through an adjustable intermediate tube), there is a resulting change in the vignetting so that it becomes necessary to adapt the employed vignetting model. A time-consuming calibration with all combinations of objectives and cameras is consequently frequently carried out with a calibration slide or another calibration object before the actual measurements.

For the sake of completeness, reference is also made to:

Martin Weigert et al., "Content-Aware Image Restoration: Pushing the Limits of Fluorescence Microscopy," Dec. 19, 2017 bioRxiv 236463;

https://doi.org/10.1101/236463, in which a method for improving image quality by means of a machine-learned model is described.

SUMMARY OF THE DISCLOSURE

It can be considered an object of the invention to provide a method and a microscopy system which enable a high-quality compensation of a vignetting in microscope images in a simple manner.

This object is achieved by means of the microscopy system and the methods with the features of the independent claims.

In a method for reducing an image vignetting according to an embodiment of the invention, a microscope image of a sample area is captured by means of a microscope, wherein the microscope image exhibits a vignetting. At least the microscope image is input into an image processing model which has been trained, by means of training data comprising input images with vignetting and associated target images without vignetting, to calculate a vignetting-free microscope image from at least the input microscope image. A calculated vignetting-free microscope image is output by the image processing model.

The machine-learned image processing model can utilize image information from the entire microscope image in order to remove the vignetting in the edge area. In an analysis of biological samples, a plurality of cells or cell organelles of the same type are typically contained in the microscope image. These structures can be shown in the image center in a higher image quality than at the shaded image edge. In principle, structures shown in a high image quality in a central image area can thus help in ensuring that the image processing model is able to calculate a vignetting-free microscope image in which structures of the same type at the image edge are displayed with an improved quality compared to the original microscope image. As camera chips with a large surface area can be used to advantage despite the occurrence of vignetting, the development and manufacture of high-quality, cost-intensive optical systems designed to facilitate a larger and more homogeneous illumination of large camera chips is not imperative.

According to a further embodiment of the invention, a method for reducing an image vignetting comprises capturing a microscope image of a sample area by means of a microscope, wherein the microscope image exhibits a vignetting. At least one vignetting-free contrast image of the same sample area is also captured, wherein the contrast image is captured with a different contrast method than the microscope image. A vignetting-free microscope image is calculated based on at least the microscope image with vignetting and the vignetting-free contrast image by means of a trained image processing model. The image processing model is trained to use the contrast image to calculate a virtually stained microscope image, which is used in the calculation of the vignetting-free microscope image.

Different contrast methods can be understood as, e.g., fluorescence images, brightfield/transmitted light images or light sheet imaging. Depending on the optical system, a vignetting can be more pronounced for fluorescence measurements than for fluorescence-free transmitted light measurements. This can in particular be the case when the same camera chip and/or at least in part the same imaging optic is used to capture the microscope image and the contrast image. It is thus possible to utilize a vignetting-free contrast image (e.g. a brightfield image) in order to compensate the vignetting of the microscope image (e.g. of a fluorescence image). Techniques known as virtual staining are used with machine-learned models in order to calculate an image-to-image mapping from one contrast type to another contrast type. On this basis, it is possible for in particular shaded edge areas of a microscope image to be replaced by calculated image content, which the image processing model calculates predominantly or exclusively from the contrast image by means of virtual staining. The central image area of the microscope image which is not affected by the edge shading, on the other hand, can be adopted without modification or essentially without modification in the calculated vignetting-free microscope image.

In contrast to the vignetting correction techniques cited in the introduction, it is possible with the invention to achieve an image quality in edge areas that is in principle equivalent to the image quality in the central area of the microscope image. In particular, a signal-to-noise ratio, an image sharpness and a color fidelity in the edge area can match the quality in the image center.

A microscopy system of the invention comprises a microscope which is configured to carry out a method according to the invention. The microscope can in particular be designed to capture a microscope image and can comprise a computing device which is configured to execute the image processing model.

A computer program according to the invention comprises commands that, when the program is executed by a computer, cause said computer to execute the method according to the invention.

Optional Embodiments

Variants of the microscopy system according to the invention and of the methods according to the invention are the object of the dependent claims and are explained in the following description.

Training of the Image Processing Model

Variations of the invention comprise the initial implementation of the training of the image processing model before the microscope image with vignetting is processed.

In a supervised or partially supervised learning process, the training data comprises input images and associated target images, which can also be called ground truth data. As described in greater detail later on, the image processing model calculates an output image from a supplied input image in the training, wherein an objective function (loss function) to be optimized detects a deviation between the output image and an associated target image. Model parameter values of the image processing model are iteratively adjusted in order to optimize the objective function. Upon completion of the training, the image processing model is able to generate output images which essentially resemble the target images.

A target image of the training data can be a microscope image without vignetting while an associated input image is a microscope image of the same sample area with vignetting.

The implementation of a training of the image processing model can occur using training data obtained from the same sample used to capture the microscope image whose vignetting is to be reduced. This ensures that structures displayed in the training data, e.g. a certain cell type, correspond precisely to the structures contained in the microscope image with vignetting (in particular in the shaded edge area). The training data can also be obtained at least partially or even entirely from the microscope images whose vignetting is to be removed by the image processing model upon completion of the training, which is explained in greater detail later on.

Optionally, it is also possible for the training data to comprise further image data or exclusively image data which does not stem from the sample used to capture at least one microscope image whose vignetting is to be corrected by the image processing model.

It is possible to use a vignetting-free central area of the microscope image whose vignetting is to be reduced as one of the target images of the training data. It is also possible for a vignetting to be added to the central area computationally and for this central area with artificial vignetting to be used as the associated input image of the training data. A particularly suitable—in terms of image content—image pair consisting of an input image and an associated target image is thereby generated for the training data. For a reliable and high-quality processing by machine-learned models, the microscope images input in the inference phase (i.e., after completion of the training) should ideally fall within a statistical distribution of the input images used in the training. This means in particular that the input images of the training should show structures (e.g. cells and cell organelles) of the same type as structures shown in the microscope image processed in the inference phase and should be captured with the same contrast properties as the microscope image processed in the inference phase. Contrast properties relate to, e.g., excited fluorescent dyes, brightfield, chemical staining, phase contrast and magnification. Depending on the image resolution, the central area of a captured microscope image can also be divided into a plurality of (optionally overlapping) sections/areas which form a plurality of input images of the training data. There is also always a pool of microscope images from which vignetting-free central areas can be drawn for the training data when a plurality of image tiles intended for subsequent assembly into an aggregate image (image stitching) are captured.

For a computational addition of a vignetting, it is possible to use vignetting correction functions known per se wherein, however, their inverse functions are applied to the target images of the training data (i.e. to the vignetting-free central areas of microscope images). A vignetting is added by this means, i.e., for example, pixels are darkened towards the image edge. In the course of a data augmentation, it is possible for vignetting to be added artificially to a vignetting-free central area in a plurality of different forms in order to generate a plurality of different input images for the training data. For example, circular and/or oval vignetting shapes can be added. It is also possible for respectively only one image section to be affected by the artificial vignetting, which corresponds to the case in the inference phase where, instead of an entire microscope image with vignetting being processed at once, a plurality of sections of the microscope image are processed one after the other. It is accordingly also possible for input images of the training data to exhibit a computationally added shading on one image side only or only towards an image corner. Instances of added vignetting can also differ in the intensity of a darkening and in the width of the transition between no darkening and a maximum darkening.

For a suitable generation of training data, properties of the vignetting of the microscope images whose vignetting is to be corrected can also be analyzed in a preliminary step. For example, an SNR, an image contrast, an image brightness, an intensity of the darkening or a radius of curvature of the annular area affected by the shading can be estimated from the microscope images. It is subsequently ensured in the generation of an artificial vignetting of the input images of the training data that these properties match or correspond within predefined limits.

A plurality of laterally offset and overlapping microscope images can be captured in particular for an image stitching, wherein these microscope images show the same sample areas once with vignetting and once vignetting-free. To this end, a lateral step size by which two microscope images differ can be selected so as to be smaller or equal to the size of the image area not affected by the vignetting. Input images for the training data can be formed from sections of the microscope images affected by vignetting while associated target images are formed from vignetting-free sections of the microscope images relating to the same sample areas. If a plurality of microscope images are captured for an image stitching, it is optionally possible to use different step sizes between the capture of adjacent microscope images: for a portion of the images captured, the step size is selected as described in the foregoing so that suitable image pairs are available for the training data; for another portion of the images captured, the step size between the capture of two overlapping microscope images is selected so as to be larger than the central area unaffected by the vignetting. The areas affected by the vignetting can then be corrected by the image processing model in accordance with the invention. The images are then combined into an aggregate image. The number of microscope images that it is necessary to capture is thus reduced compared to conventional methods.

Additional Vignetting-Free Central Area of Another Microscope Image

It can optionally be provided that at least one vignetting-free central area of another microscope image of the same sample can additionally be input into the image processing model. This image data can be input together with a microscope image whose vignetting is to be removed. This can yield advantages when there are no or hardly any objects of interest, e.g. biological cells, in the central area of the microscope image whose vignetting is to be compensated. In such a case, the central area of another microscope image helps the image processing model to learn what kind of objects will likely have to be reconstructed in the shaded edge areas. This is because cells of a same type typically occur over a larger area under analysis in biological samples. The selection of the other microscope image whose central area is additionally input can occur by establishing, among a plurality of captured microscope images of the same sample, the microscope image or images that show the largest number of objects of interest.

For the above-described variant, two input images can be input into the image processing model in the training simultaneously: one of the input images exhibits a vignetting and does not show any structures of interest in its central area (or fewer structures of interest than a predetermined number) while the other input image shows a plurality of structures of interest, e.g. biological cells, and is in particular captured using the same sample. In this case, the associated target images can also comprise two target images: one target image shows the sample area of the microscope image with vignetting without vignetting; the other target image can resemble the input image with a plurality of structures of interest. The image processing model does not learn, for instance, an autoencoder separately from a vignetting removal by means of the common image processing; rather, the reconstruction of the input image with structures of interest has a stabilizing effect on the vignetting removal and ensures that object types of the same type, e.g. certain cell structures, are reconstructed in a high quality in the shaded area.

Vignetting Removal Via Virtual Staining

Virtual staining methods in which the training data comprises input images of one contrast method and target images of another contrast method are known per se. Depending on the microscope design, it can readily be possible to capture microscope images of the same sample area with two different contrast methods, wherein a magnitude/strength of vignetting can differ as a function of the contrast method. In particular in such cases, virtual staining can be used to remove a vignetting.

For a better distinguishability of terminology, the words "contrast image" and "microscope image" are intended to denote two images captured by a microscope with different contrast methods. It is generally irrelevant here which contrast method is used for capturing the microscope image and which contrast method is used for capturing the contrast image. What is relevant is rather that the strength and/or size of the vignetting in the two images differs.

A vignetting-free microscope image is generated using both the microscope image with vignetting and the contrast image. A virtually stained microscope image can be generated from the contrast image by means of virtual staining by the image processing model. For the calculation of the vignetting-free microscope image, a central area of the microscope image with vignetting can be retained and a shaded edge area can be replaced by a corresponding image area of the virtually stained microscope image. Optionally, a quality control is possible in which a central area of the virtually stained microscope image is compared with the central area of the microscope image with vignetting. If a deviation between these central areas exceeds a predefined limit, the virtually stained microscope image can be identified as qualitatively inadequate. As a result, a warning can be output or, instead of the described vignetting correction, a simple brightening of the shaded edge areas can occur, e.g., by means of a correction function. The deviation can be measured as a difference per pixel, e.g., by means of the L1 norm, L2 norm or SSIM which are defined later on.

In a variant, an edge area of the vignetting-free microscope image is not obtained using the virtually stained microscope image alone but also using the shaded edge area of the original microscope image. To this end, for example, the image processing model can respectively receive as input in the training an image pair consisting of a microscope image with vignetting and a contrast image, wherein both images show the same or overlapping sample areas. A microscope image of the same sample area without vignetting can be used as the target image in the training. In this approach, the image processing model can output the vignetting-free microscope image directly without it being necessary to generate a virtually stained microscope image different therefrom separately. Microscope images with artificial vignetting, which can be added computationally as described above, can be used for the training. The other descriptions relating to training data in the foregoing can also be implemented for the described variants of an image processing model that receives a contrast image as input.

General Features

A vignetting of a (microscope) image is understood as an edge shading, which in the present disclosure can generally be understood as a reduction of the image quality towards the image edge. In particular, one or more of the following properties can apply: an image brightness, a contrast, a signal-to-noise ratio and/or an image sharpness drop off towards the image edge; color errors and/or optical distortions increase towards the image edge. "Vignetting-free" or "without vignetting" is intended to denote that either no vignetting at all is present or a vignetting that is less intense than the vignetting of the microscope image input into the image processing model. The image processing model thus performs a reduction, removal, compensation or correction of the vignetting, wherein these terms are used interchangeably.

A microscopy system denotes an apparatus that comprises at least one computing device and a microscope. A microscope can in particular be understood as a light microscope, an X-ray microscope, an electron microscope or a macroscope. An imaging can occur, e.g., by means of a scanning system or in the form of a widefield imaging.

The computing device can be designed in a decentralized manner, be physically part of the microscope or be arranged separately in the vicinity of the microscope or at a location at any distance from the microscope. It can generally be formed by any combination of electronics and software and can comprise in particular a computer, a server, a cloud-based computing system or one or more microprocessors or graphics processors. The computing device can also be part of the sample camera and/or can be configured to control the sample camera, image capture, the sample stage and/or other microscope components. A decentralized configuration of the computing device exists in particular when the training of the image processing model occurs with different hardware than the use of the image processing model in the inference phase, i.e. after completion of the training.

The sample can be any sample and can comprise, for example, biological cells or cell parts, material samples or rock samples, electronic components and/or objects held in a liquid.

The microscope is configured to capture microscope images and optionally contrast images. In principle, a microscope image can be any raw image captured by a microscope or a processed image. The processed image can be derived from one or more raw images or from pre-processed images of a microscope. For example, a microscope image can be an image which has undergone a perspective transformation and/or which is calculated by means of a brightness, contrast or tone adjustment. The microscope image can in particular be an overview image or a sample image or be derived from the same. An overview image is understood to be an image captured by an overview camera, which can be provided in addition to a sample camera of the microscope with which more magnified images (sample images) of a sample area are captured. The above descriptions can also apply mutatis mutandis to contrast images. It is also possible to use a point detector instead of an area/2D camera, as is standard in, e.g., laser scanning microscopes. A point detector can also serve to capture, for example, a fluorescence image or to generate brightfield/transmitted light images via a tPMT (transmission photomultiplier tube).

Variations of the described embodiments result when, instead of capturing microscope images or contrast images, the corresponding image data is received, in particular loaded from a data memory or received via a network connection. In these cases, the described removal of a vignetting can occur independently of the operation of a microscope.

Descriptions in the singular are intended to cover the variants "exactly 1" as well as "at least one". The description that a microscope image is input into the image processing model is intended to comprise, for example, the possibilities that exactly one or at least one microscope image is entered. A joint input of a plurality of microscope images can be advantageous, e.g., for the input of an image stack (z-stack) consisting of a plurality of microscope images which show sample layers at different depths/heights or for the input of a plurality of microscope images showing the same sample area captured in succession. Similarly, the input of a microscope image is also intended to comprise the input of volumetric microscope data corresponding to a plurality of 2D images captured at different heights.

A target image can be understood as an image used in the training of the image processing model that an output of the image processing model is intended to approximate. The approximation occurs by means of an objective function, in particular a reward and/or loss function, which defines how differences between the output of the image processing model and the target image are assessed. The assessment of the differences can occur for each pixel or by comparing more abstract image depictions, e.g. edge contours. The deviation/difference can be measured, e.g., by means of a difference per pixel, in particular in the form of a deviation between output images and target images that is summed/averaged as an absolute value per pixel (L1 standard), or in the form of a squared deviation between output images and target images per pixel (L2 standard). Alternatively, the loss function can feature a structural similarity index (SSIM) or a multiscale structural similarity index (MS-SSIM). A difference between images is assessed in this case by means of an image luminance, an image contrast and a displayed structure, wherein these three properties are combined into an overall assessment. Sections of the images can respectively be compared with one another with respect to these properties. With MS-SSIM, these assessments are additionally carried out at different scales or with different resolution-reduced copies of the images, wherein the assessments relating to different scales are again combined into an overall assessment.

An image processing model is understood to be a machine-learned model which receives at least one input image and calculates at least one output image therefrom. Learned models denote models that have been learned by a learning algorithm using training data. The models can respectively comprise, for example, one or more convolutional neural networks (CNNs), which receive at least one image comprising the microscope image or image data derived therefrom as input. A learning algorithm allows model parameters of the model to be established using the training data. A predetermined objective function can be optimized to this end, e.g. a loss function can be minimized. The model parameter values are modified to minimize the loss function, which can be calculated, e.g., by gradient descent and backpropagation. In the case of a CNN, the model parameters can in particular comprise entries of convolution matrices of the different layers of the CNN. Layers that do not follow each other directly can optionally be connected by so-called "skip connections", whereby the output of a layer is transmitted not only to the immediately following layer but additionally to another layer. A U-network is also possible in which successive layers form a U-shape in the sense that feature maps output by the layers first become increasingly smaller in terms of the number of rows and columns they contain and increasingly larger in terms of their depth before becoming larger again in terms of the number of rows and columns they contain and smaller in terms of their depth. A design in the form of a cGAN (conditional generative adversarial networks) is also possible. In this case, an adversarial loss is added, i.e. a discriminator which estimates whether an input image pair is a microscope image and a predetermined target image or a microscope image and an output image calculated by the model. The optimization of the loss function for generating the output image is intended to facilitate both a minimization of differences between the output image and the predetermined target image and a deception of the discriminator. Other model architectures of a deep neural network are also possible.

An input into the image processing model can also comprise further data in addition to at least one microscope image, in particular contextual information relating to the at least one microscope image, e.g., information regarding a type of imaging used to capture the microscope image, a microscope parameter used in said imaging, or a sample type, e.g., which cell lines are displayed. The contextual information is input in the training. The input of contextual information in the inference phase is optional.

Descriptions of processes of methods according to the invention are not intended to be understood as exhaustive. Further intermediate steps can be added at in principle any point. In particular, steps for an ensemble learning can be added in order to train or form the image processing model.

The characteristics of the invention that have been described as additional apparatus features also yield, when implemented as intended, variants of the method according to the invention. Conversely, a microscopy system can also be configured to carry out the described method variants. In particular, the computing device can be configured to execute the described method variants. The computing device can also comprise the described computer program.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components.

DETAILED DESCRIPTION OF EMBODIMENTS

Figure 1:
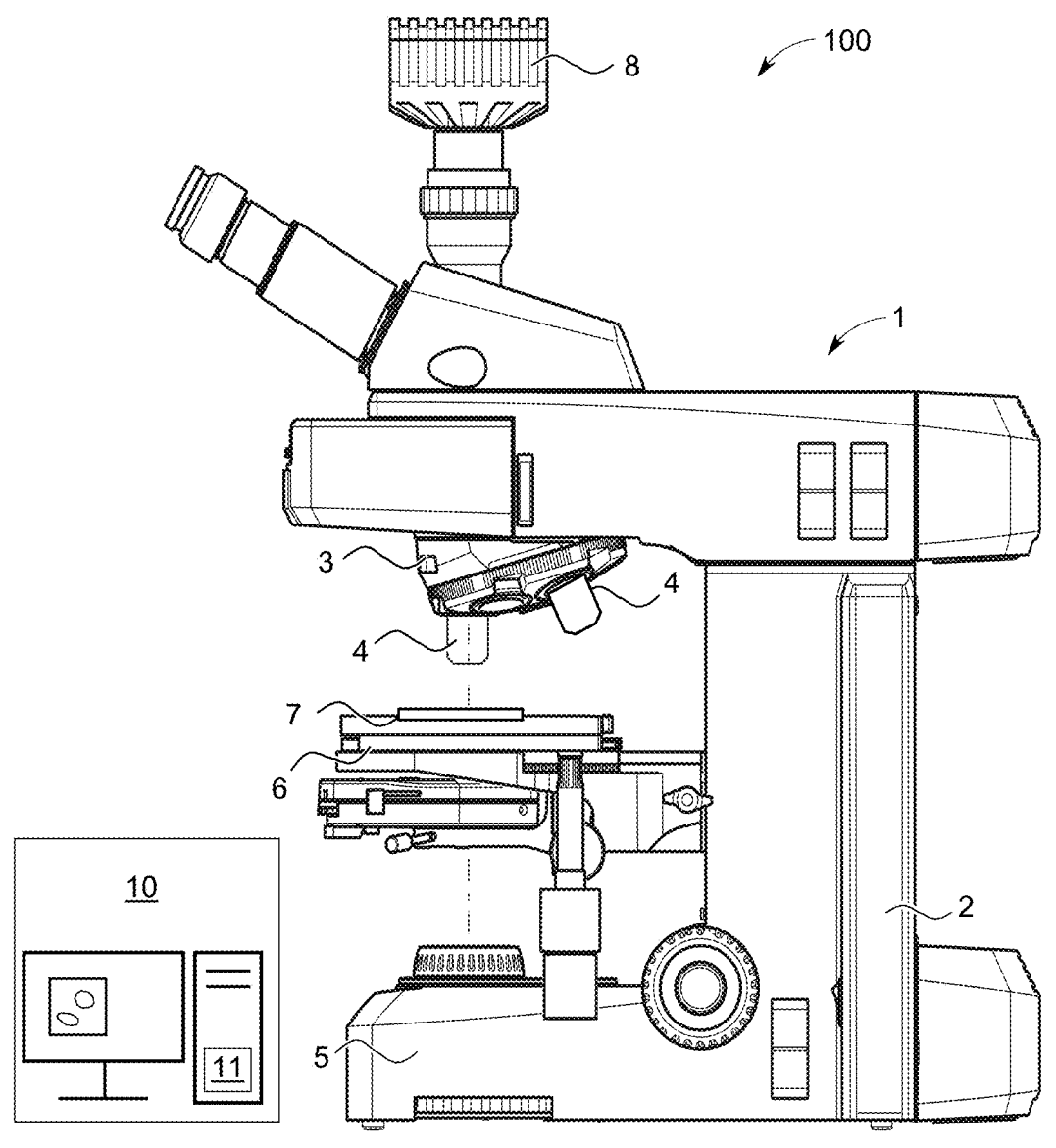
FIG. 1 is a schematic illustration of a microscopy system of the invention.

Different example embodiments are described in the following with reference to the figures.
FIG. 1

Figure 2:
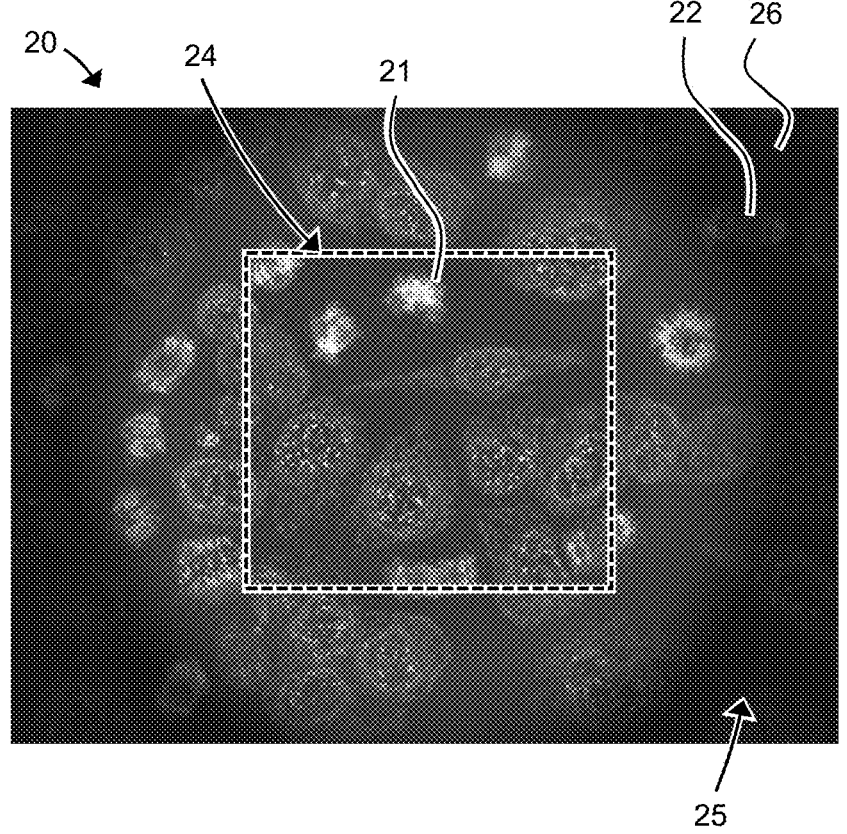
FIG. 2 is a schematic illustration of processes of a method according to the invention.
Figure 2:
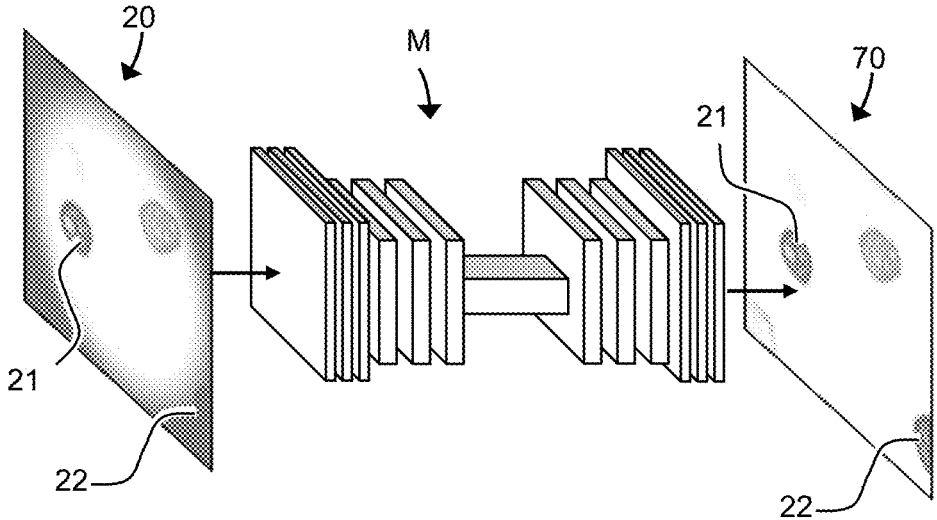

FIG. 1 shows an example embodiment of a microscopy system 100 according to the invention. The microscopy system 100 comprises a computing device 10 and a microscope 1, which is a light microscope in the illustrated example, but which in principle can be any type of microscope. The microscope 1 comprises a stand 2 via which further microscope components are supported. The latter can in particular include: an illumination device 5; an objective changer/revolver 3, on which objectives 4 are mounted in the illustrated example; a sample stage 6 with a holding frame for holding a sample carrier 7; and a microscope camera 8. An analyzed sample can be any object, fluid or structure. The computing device 10 comprises a computer program 11 with an image processing model for processing at least one microscope image. This is discussed in greater detail in the following with reference to the following figures.
FIG. 2

FIG. 2 schematically shows a microscope image 20 exhibiting a vignetting 25. A central area 24 of the microscope image 20 is homogeneously illuminated and shows sample structures 21 in a high image quality. An edge area 26, on the other hand, is shaded so that sample structures 22 in the edge area 26 are less discernible. In particular, a contrast and a signal-to-noise ratio (SNR) are worse in the darker edge area 26 than in the central area 24.

A vignetting 25 occurs in particular when the camera chip used is larger than a cross-section that can be homogeneously illuminated by the optics of the microscope.

According to an embodiment of the invention, the microscope image 20 is input into a machine-learned image processing model M trained to calculate a vignetting-free microscope image 70 from the microscope image 20 with vignetting. In the vignetting-free microscope image 70, not only are the image brightness and contrast in the edge area adjusted so as to correspond to the brightness and contrast in the image center, but the SNR in the edge area is also improved and approximates the SNR in the image center. Sample structures 22 which were barely visible in the microscope image 20 are displayed in the vignetting-free microscope image 70 with an image quality comparable to that of sample structures 21 in the central area of the microscope images 20 and 70.

By entering not only the shaded edge area 26 into the image processing model M for processing, but also the central area 24 (which is not affected by the vignetting and which can thus remain essentially unchanged), the image processing model M is able to utilize image information from the central area 24 in order to depict sample structures 22 in the edge area 26 more precisely and in greater detail. This is fundamentally because sample structures and image properties in the central area 24 are indicative of the type of sample structures found in the edge area 26. The central area 24 can thus also be called a reference region. Possible approaches for forming the image processing model M are described in the following with reference to the further figures.

Figure 3:
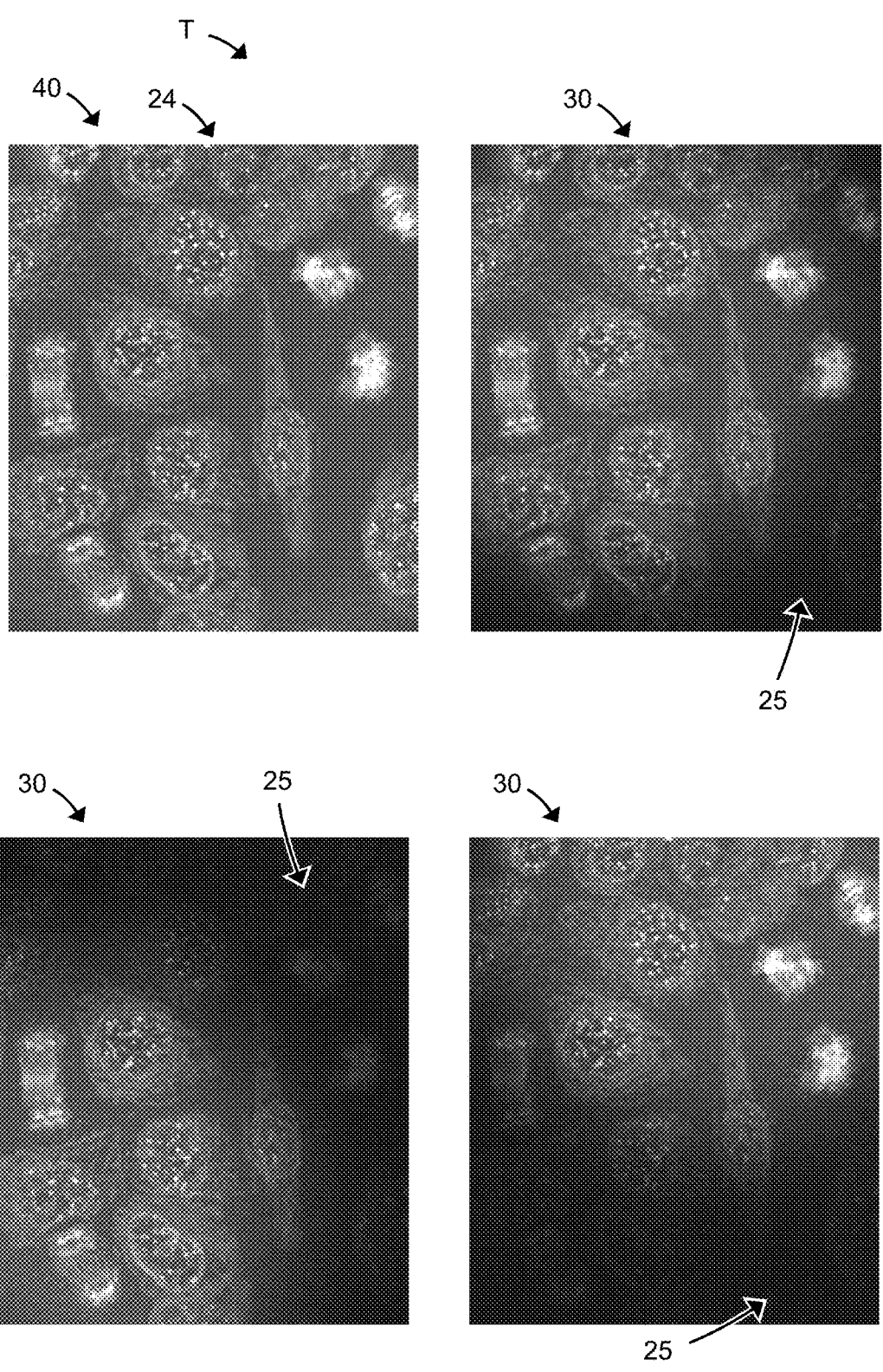
FIG. 3 schematically shows images used as training data in example embodiments of the invention.
Figure 4:
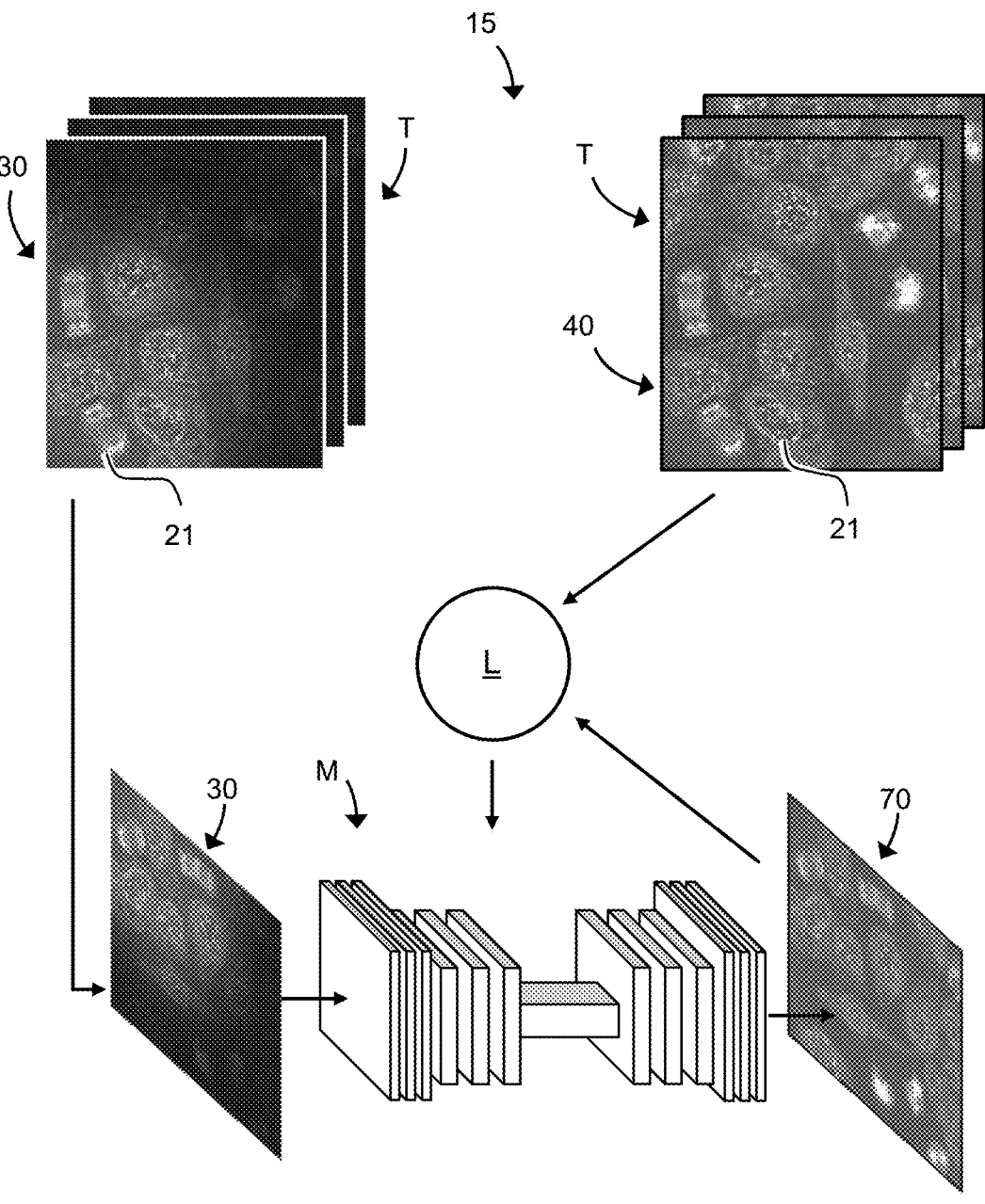
FIG. 4 schematically shows a training of an image processing model of example embodiments of the invention.

FIGS. 3 and 4

FIG. 3 shows an example of training data T for a training 15 of the image processing model M, said training 15 being shown schematically in FIG. 4. The training data T comprises a plurality of input images 30, which are input into the image processing model M in the training 15. The image processing model M calculates a respective output image 70 from each input image 30 based on current model parameter values. The output images 70 are input together with predetermined target images 40 of the training data T into a loss function L, which establishes a deviation between the output image 70 and the target image 40. An established deviation is used to adjust the current model parameter values by means of backpropagation and gradient descent methods. Input images 30 of the training data T are then again input into the image processing model M and there occurs a further iteration in which a deviation between the newly calculated output images 70 and the associated target images 40 is established.

There may be distinctive characteristics in the selection or formation of the training data T. As shown in FIG. 3, the central area 24 of a microscope image which exhibits a vignetting is used as a target image 40. The microscope image in question can in fact be the microscope image input into the image processing model M for vignetting removal upon completion of the training. FIG. 3 further shows how input images 30 of the training data T can be formed from the target image 40, i.e. from the central area 24: To this end, a vignetting 25 is added artificially, i.e. an edge area of the central area 24 is shaded computationally, in particular darkened, reduced in contrast and/or provided with artificial image noise to reduce the SNR. One or more associated input images 30 with vignetting 25 can be generated in this manner from the target image 40, i.e. from an image corresponding to the central area 24. As illustrated, the vignetting 25 does not have to affect all image edges so that it is possible to provide radii of curvature of the vignetting 25 similar to those found in the original microscope image 20 with vignetting 25 (cf. FIG. 2).

By means of this artificial vignetting generation for the training data T, it is possible to comply with the principle that a microscope image to be processed in the inference phase (after completion of the training) should not be part of the image data used in the training 15.

If a plurality of microscope images of the same sample are captured, it is possible for the described approach for generating training data to occur for a plurality of microscope images via the respective central area of a microscope image, whereby a greater amount of training data can be generated. It is thereby possible to use exclusively training data derived from the sample under analysis. This ensures that the training data used is statistically suitable for the microscope image to be processed in the interference phase in terms of the displayed structures. The problem is thereby obviated that an essentially arbitrary variety of different sample types can be analyzed with a microscope—including in particular new, previously unknown sample types—and that it is difficult to provide suitable training data for this variety in advance.

The image processing model M can be trained with randomly selected initial values of the model parameters. Alternatively, the image processing model M can be pre-trained by means of a prior training using other training data and the values of the model parameters after this training are used as initial values of the model parameters for the training described above. It is also possible for a part of the image processing model M to be defined by means of a previous training (pre-trained) while model parameters of another part of the image processing model M are defined by the training described here. For example, input image data can first be processed by a pre-trained feature extractor and an output (feature vector/map) of the feature extractor is input into a subsequent part ("head"), which calculates the output image therefrom. Only model parameter values of the head are subsequently adjusted by means of the described training.

It is optionally also possible for the training data T used in the described training 15 to comprise, in addition to image data derived from the sample in relation to which microscope images are to be processed in the inference phase, further image data from other samples, which can potentially improve the robustness and generalizability of the learned model. Depending on the size of a microscope image 20, a plurality of adjacent or overlapping central areas 24 not affected by the vignetting of the microscope image 20 can also be selected from a single microscope image 20 and used as target images 40 in the training 15.

FIG. 5

Figure 5:
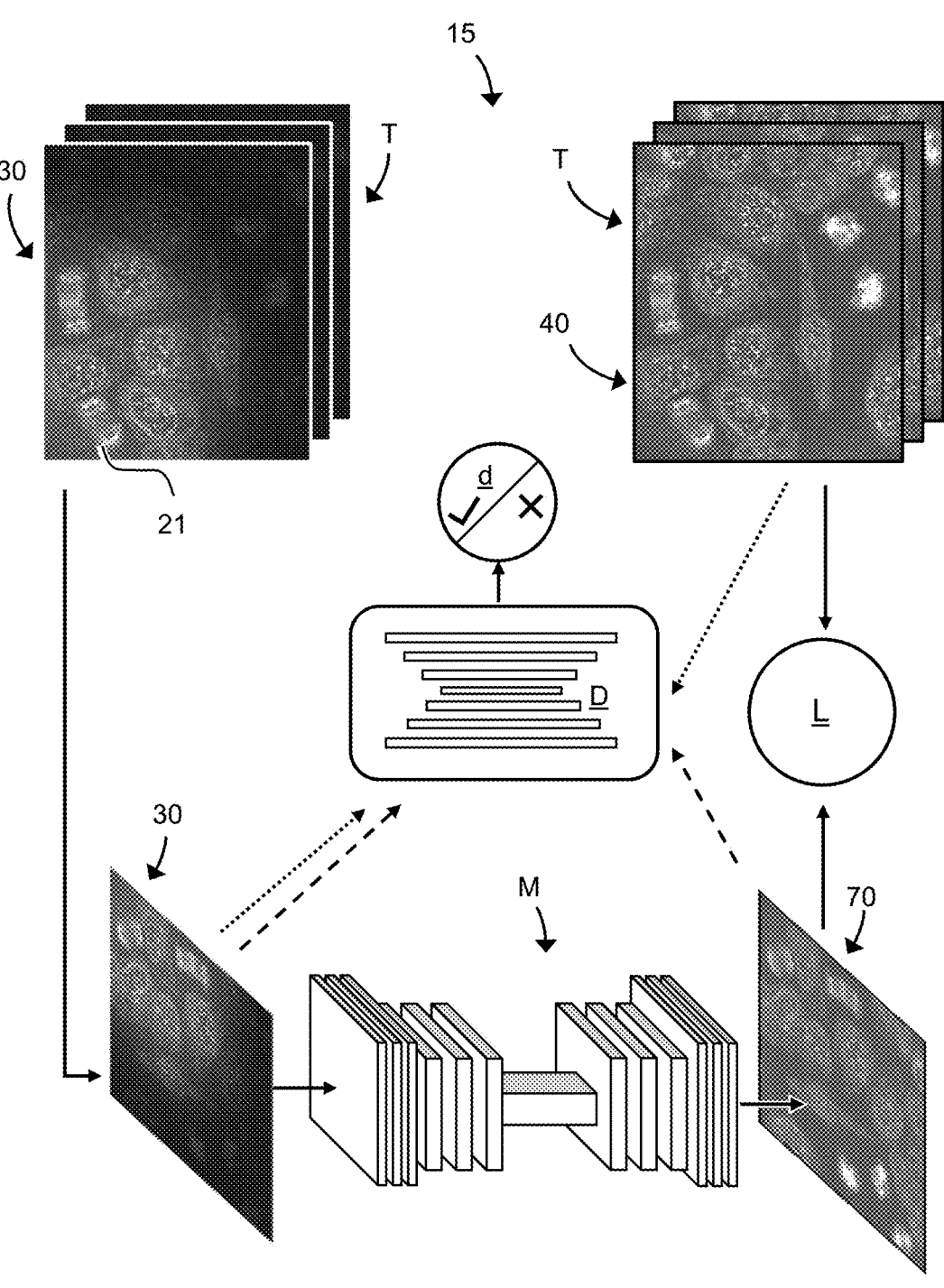
FIG. 5 schematically shows a training of an image processing model of further example embodiments of the invention.

FIG. 5 illustrates a further training 15 of an image processing model M according to a variant embodiment of a method according to the invention. The illustrated embodiment is a variant of the example illustrated in FIG. 4, which is supplemented by an adversarial loss. A cGAN (conditional generative adversarial network) is thereby provided.

The image processing model M features a generator that is trained together with a discriminator D. The discriminator D receives an image pair as input, namely either an input image 30 together with the associated target image 40 (dotted lines in FIG. 5) or the input image 30 together with the calculated output image 70 (dashed lines in FIG. 5). The discriminator D outputs a discrimination result d indicating whether the discriminator D estimates that the input image pair comprises the target image 40 or the output image 70. In the objective function of the discriminator D, a correct classification is rewarded and an incorrect classification is penalized. The objective function of the discriminator D is optimized so as to ideally always perform correct classifications. The loss function L of the image processing model M comprises the objective function of the discriminator D and is optimized to deceive the discriminator D. An architecture of the image processing model M can be, e.g., a U-net or another type of CNN.

FIG. 6

The approaches described in the foregoing are in particular advantageous when there are microscope images of only one contrast method and it is intended to remove a vignetting of these microscope images. In these cases, as described in the foregoing, a central image area of a high quality can be exploited in order to improve image information in a shaded edge area.

Figure 6:
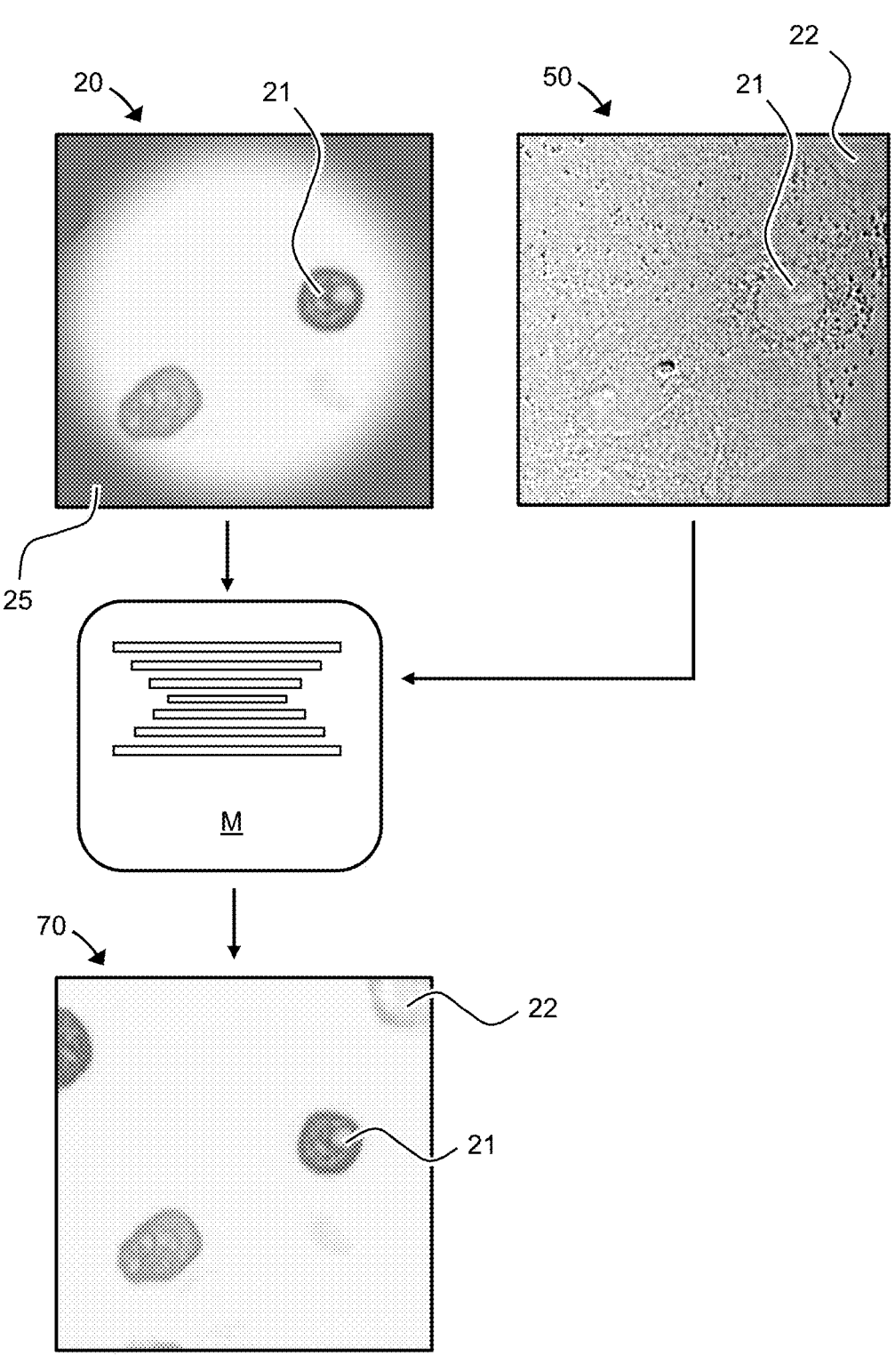
FIG. 6 is a schematic illustration of processes of further example embodiments of the invention.

In contrast, FIG. 6 relates to cases where there is, in addition to a microscope image 20 with vignetting 25, a contrast image 50 without vignetting. The microscope image 20 and the contrast image 50 can be captured by the same microscope using different contrast methods. In the present case, the microscope image 20 is a schematically depicted fluorescence image in which biological samples fluoresce as a result of the DAPI stain. The contrast image 50 here is a phase contrast image, although brightfield images or images captured by transmitted light absorption are in principle also possible. Depending on the contrast method, the size of the illuminated area on the camera sensor can differ in the same microscope so that a vignetting varies in intensity as a function of the contrast method or may not even occur at all as in the case of the depicted contrast image 50. The microscope image 20 and the contrast image 50 are registered, i.e. they show the same sample area.

An image processing model M is used to calculate, based on the microscope image 20 with vignetting 25 and the contrast image 50, a vignetting-free microscope image 70 as an output image. A central area of the vignetting-free microscope image 70 corresponds to or is identical with a central area of the microscope image 20. The edge area shaded by the vignetting 25, on the other hand, is improved by means of image information of the contrast image 50. As a result, even sample structures 22 that were barely visible or not visible at all in the microscope image 20 because of the vignetting 25 become clearly discernible in the vignetting-free microscope image 70.

Possible approaches for forming the image processing model M used here are described with reference to the following figures.

FIG. 7

Figure 7:
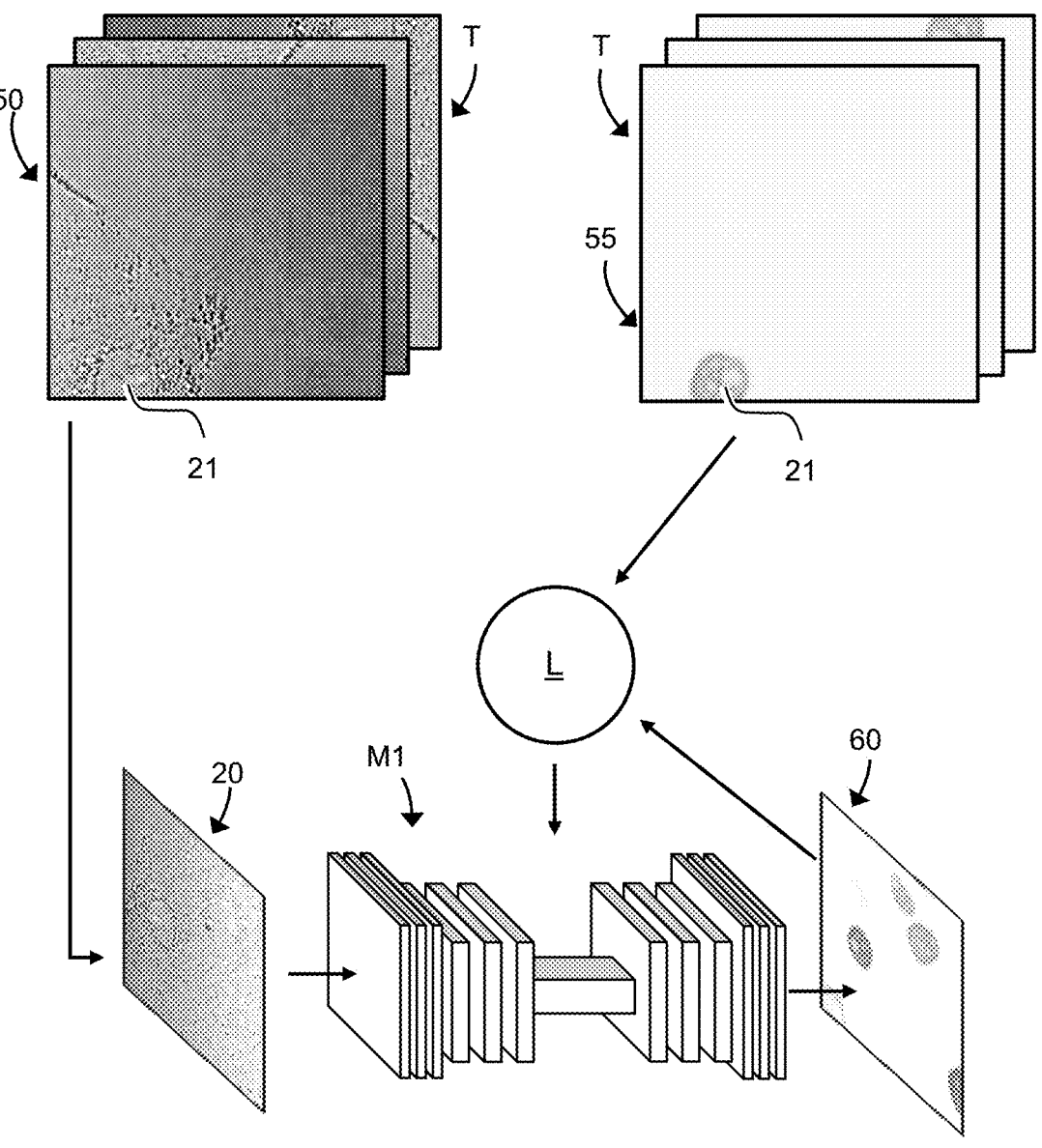
FIG. 7 schematically shows a training of an image processing model of example embodiments of the invention.

FIG. 7 schematically shows a training 15 of a virtual staining model M1—VS model M1 in the following—which is part of the image processing model M shown in FIG. 6. The training data T comprises vignetting-free contrast images 50 as input images and vignetting-free microscope images 55 as target images. The contrast images 50 and associated microscope images 55 are registered, i.e. they show the same sample areas. Analogously to the description above, a loss function L which captures differences between the target images (i.e. the microscope images 55) and the output images calculated by the VS model M1 is minimized. The VS model M1 is thus iteratively adjusted so as to calculate, from an input contrast image 50, a virtually stained microscope image 60 which ideally corresponds to the microscope image 55 provided in the training. The use of the VS model M1 in the inference phase is described with the help of the following figure.

FIG. 8

Figure 8:
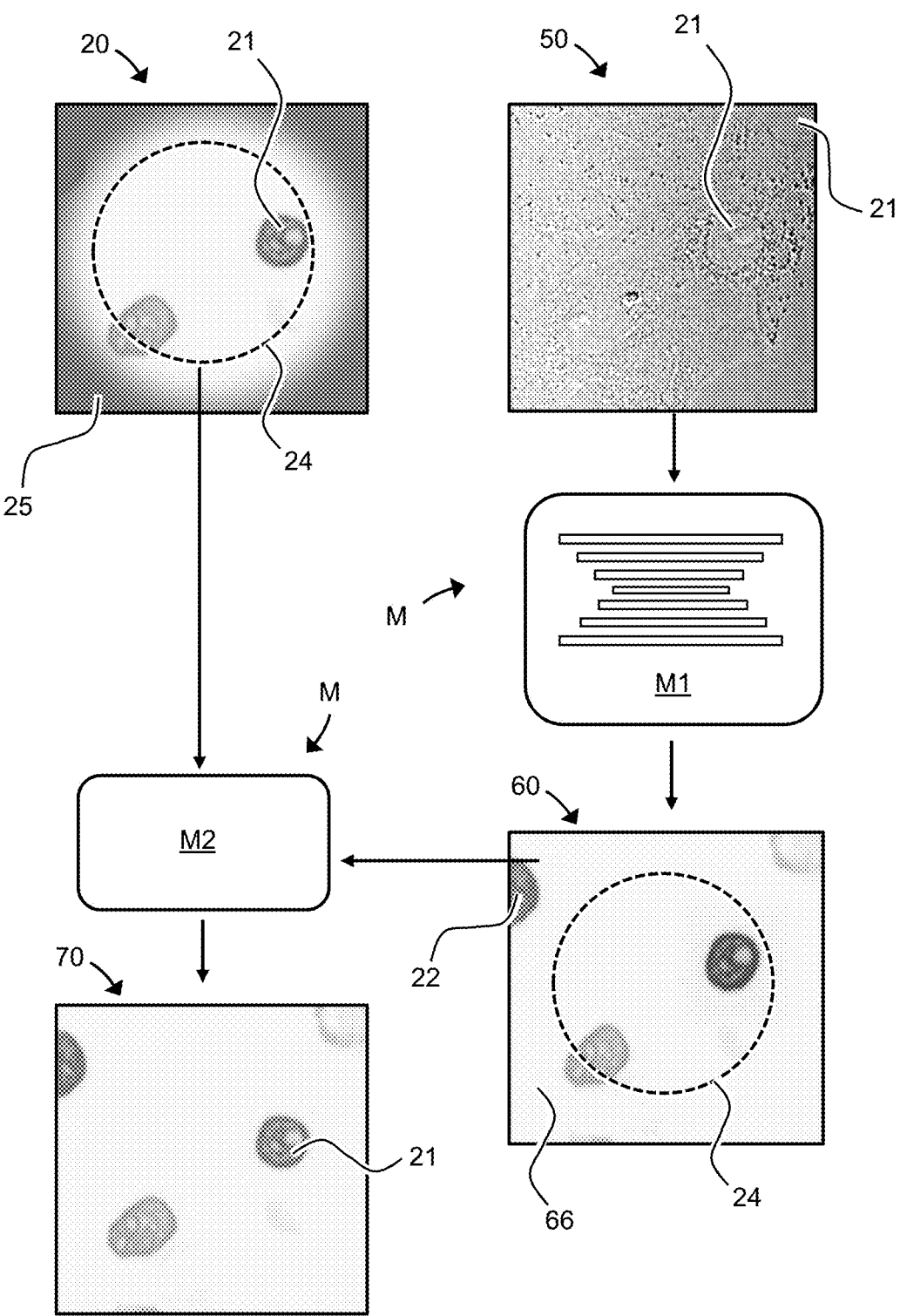
FIG. 8 is a schematic illustration of processes of example embodiments of the invention.

FIG. 8 shows the input of a contrast image 50 into the ready-trained VS model M1, wherein the contrast image 50 was not part of the training data. The VS model M1 calculates a virtually stained microscope image 60 from the contrast image 50. The virtually stained microscope image 60 is used to remove the vignetting 25 of the microscope image 20 computationally. For example, a program M2 forms a vignetting-free microscope image 70 by using the central area 24 of the microscope image 20 that is not affected by the vignetting 25 as the central area of the vignetting-free microscope image 70. At the same time, the program M2 replaces the edge area shaded by the vignetting 25, i.e. the image area outside the central area 24 of the microscope image 20, with an edge area 66 of the virtually stained microscope image 60.

In this variant embodiment, the VS model M1 and the program M2 together form the image processing model M. In a variant, a VS model M1 as depicted is used to calculate a virtually stained microscope image 60 while an image processing model M as described with reference to FIGS. 2-5 calculates a vignetting-free microscope image from the microscope image 20. This vignetting-free microscope image can be compared with the virtually stained microscope image 60. A correspondence between these images can serve as a measure of the predictive accuracy with respect to structures in the edge area. Alternatively or additionally, this vignetting-free microscope image and the virtually stained microscope image 60 can be employed in a calculation in order to form an improved vignetting-free microscope image.

Alternatively, the image processing model M can also be a machine-learned model which receives both the contrast image 50 and the microscope image 20 with vignetting 25 as input data and calculates a vignetting-free microscope image directly therefrom, as explained with reference to the following figure.

FIG. 9

Figure 9:
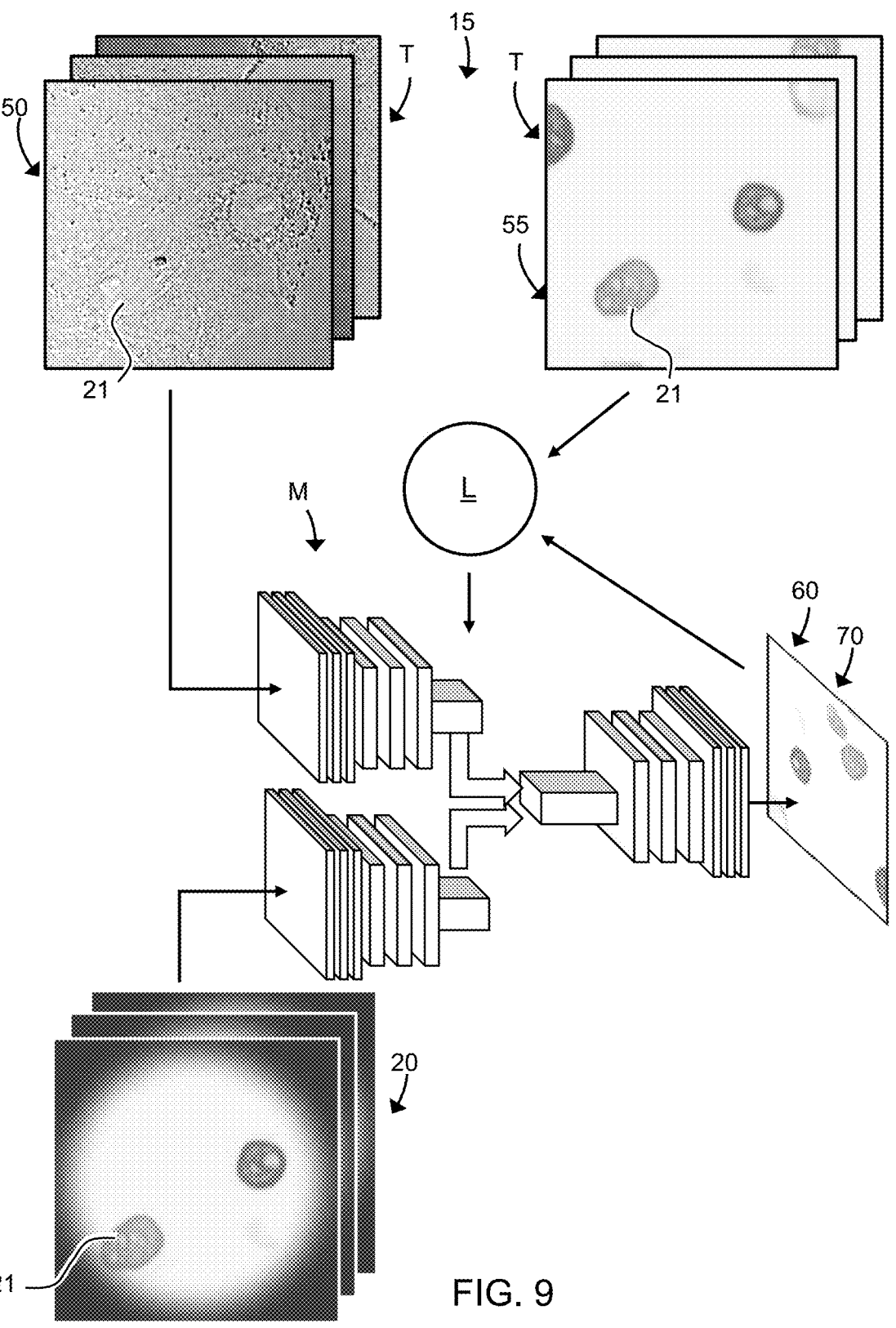
FIG. 9 schematically shows a training of an image processing model of example embodiments of the invention.

FIG. 9 shows a training 15 of an image processing model M which receives both contrast images 50 and microscope images 20 with vignetting 25 as input data. From such an input image pair, the image processing model M calculates a single output image, which is intended to be a vignetting-free microscope image 70. To this end, a loss function L is minimized that calculates deviations between the output images and predetermined target images, which are vignetting-free microscope images 55. A calculated vignetting-free microscope image 70 can also be called a virtually stained microscope image 60, as image information is derived in part from a different contrast method, namely from the contrast image 50.

The variants described with reference to the different figures can be combined with one another. Variants of the described example embodiments are also possible within the scope of the attached claims. In the described examples, the training images and the images to be evaluated after the training stem from the same sample. The image data here can be partially identical when, e.g., a central area is used as the target image. Alternatively, the image data for the training and the images to be evaluated after the training can stem from different sample areas of the same sample. Further variants of the described illustrated examples result when the image data used for the respectively described training stems from samples other than those displayed in the microscope images whose vignetting is to be removed by the ready-trained image processing model. The input images of the training data described with reference to FIGS. 3 and 4 do not have to be generated via a computational addition of an artificial vignetting. Instead, in a variant, captured microscope images with vignetting can be used as input images, wherein associated target images can be formed, e.g., by stitching together a plurality of laterally offset and overlapping microscope images into a larger image, wherein only the central areas without edge shading are used for the stitching.

LIST OF REFERENCE SIGNS

1 Microscope
2 Stand
3 Objective revolver
4 (Microscope) objective
5 Illumination device
6 Sample stage
7 Sample carrier
8 Microscope camera
10 Computing device
11 Computer program
15 Training
20 Microscope image
21 Sample structures (biological cells) in the microscope image
22 Sample structures in the shaded edge area 26
24 Central area of the microscope image not affected by the vignetting
25 Vignetting; artificially added vignetting
26 Shaded edge area

30 Input image of the training data, which exhibits a vignetting

40 Vignetting-free target image in the training of the image processing model

50 Contrast image

55 Microscope image used as target image, in particular in the training of a virtual staining model

60 Virtually stained microscope image

66 Edge area of the virtually stained microscope image 60

70 Calculated vignetting-free microscope image/output image of the image processing model

100 Microscopy system

D Discriminator d Discrimination result of the discriminator

L Loss function

M Image processing model for reducing an image vignetting

M1 Virtual staining model

M2 Program forming part of the image processing model M

T Training data, in particular for learning the image processing model M

What is claimed is:

1. A method for reducing an image vignetting, comprising:

capturing a microscope image of a sample using a microscope, wherein the microscope image exhibits a vignetting;

inputting at least the microscope image and at least one vignetting-free central area of a further microscope image of the sample jointly into an image processing model which has been trained, using training data comprising input images with vignetting and associated target images without vignetting, to calculate a vignetting-free microscope image from at least the input microscope image; and outputting a calculated vignetting-free microscope image calculated from at least both the input microscope image and the at least one vignetting-free central area of the further microscope image using the image processing model.

2. The method according to claim 1, further comprising:

carrying out a training of the image processing model using training data obtained from the sample used to capture the microscope image whose vignetting is to be reduced.

3. The method according to claim 1, wherein a vignetting-free central area of the microscope image whose vignetting is to be reduced is used as one of the target images of the training data, and wherein a central area with computationally added vignetting is used as an associated input image of the training data.

4. The method according to claim 1, further comprising:

capturing a plurality of laterally offset, overlapping microscope images showing the same sample areas once with vignetting and once vignetting-free; and forming input images for the training data from areas of the microscope images with vignetting, and forming associated target images from vignetting-free areas of the microscope images relating to the same sample areas.

5. The method according to claim 1, wherein the further microscope image, whose central area is also input into the image processing model, is selected from a plurality of captured microscope images, according to a criterion based on which an image selected as the further microscope image shows a largest number of objects of interest among the plurality of captured microscope images.

6. The method according to claim 1, further comprising:

capturing the further microscope image of the same sample area, wherein the further microscope image is captured with a different contrast method than the microscope image;

calculating the vignetting-free microscope image using the image processing model, which is trained to use the further microscope image to calculate a virtually stained microscope image, which is used in the calculation of the vignetting-free microscope image.

7. The method according to claim 6, wherein, in order to calculate the vignetting-free microscope image, a central area of the microscope image with vignetting is retained and a shaded edge area is replaced by a corresponding image area of the virtually stained microscope image.

8. The method according to claim 1, wherein the image processing model is trained to receive both the microscope image with vignetting and the further microscope image as inputs and to calculate the vignetting-free microscope image directly therefrom as an output.

9. A microscopy system with a microscope configured to carry out the method according to claim 1.

10. A non-transitory computer-readable medium including a computer program comprising commands which, when the program is executed by a computer, cause said computer to execute the method according to claim 1.

11. The method of claim 1, further comprising:

capturing at least one vignetting-free contrast image of a sample area captured with the microscope image, wherein the contrast image is captured with a different contrast method than the microscope image;

calculating a virtually stained microscope image from the at least one vignetting-free contrast image using a virtual staining model, wherein a contrast method of the virtually stained microscope image corresponds to a contrast method of the microscope image;

using the image processing model to generate the calculated vignetting-free microscope image from the virtually stained microscope image and the microscope image.

12. The method according to claim 11, wherein calculating the vignetting-free microscope image includes:

using a central area of the microscope image with vignetting for the calculated vignetting-free microscope image; and replacing a shaded edge area of the microscope image by a corresponding image area of the virtually stained microscope image.

13. The method according to claim 11, wherein the image processing model and the virtual staining model are formed as one model.

14. A method for reducing an image vignetting, comprising:

capturing a microscope image of a sample area using a microscope, wherein the microscope image exhibits a vignetting;

capturing at least one vignetting-free contrast image of the sample area captured with the microscope image, wherein the contrast image is captured with a different contrast method than the microscope image;

calculating a virtually stained microscope image from the at least one vignetting-free contrast image using a virtual staining model, wherein a contrast method of the virtually stained microscope image corresponds to a contrast method of the microscope image;

inputting at least the microscope image and the virtually stained microscope image into an image processing model which includes a model trained with training data comprising input images with vignetting and associated target images without vignetting to calculate a vignetting-free microscope image; and using the image processing model to calculate a vignetting-free microscope image from the virtually stained microscope image and the microscope image.

15. The method according to claim 14, wherein calculating the vignetting-free microscope image includes:

using a central area of the microscope image with vignetting for the calculated vignetting-free microscope image; and replacing or modifying a shaded edge area of the microscope image by a corresponding image area of the virtually stained microscope image.

16. The method according to claim 1, wherein the microscope image and the at least one vignetting-free central area of the further microscope image show different regions of the sample, wherein the at least one vignetting-free central area of the further microscope image shows a larger number of objects of interest than the microscope image.

17. The method according to claim 1, wherein the image processing model has been trained using at least a microscope image and a further microscope image jointly as two input images to calculate one vignetting-free output image which is compared with an associated target image without vignetting.

18. A microscopy system comprising:

a microscope configured to carry out a method for reducing an image vignetting, the method comprising:

capturing a microscope image of a sample area using the microscope, wherein the microscope image exhibits a vignetting;

capturing at least one vignetting-free contrast image of the sample area captured with the microscope image, wherein the contrast image is captured with a different contrast method than the microscope image;

calculating a virtually stained microscope image from the at least one vignetting-free contrast image using a virtual staining model, wherein a contrast method of the virtually stained microscope image corresponds to a contrast method of the microscope image;

inputting at least the microscope image and the virtually stained microscope image into an image processing model which is configured to calculate a vignetting-free microscope image from the virtually stained microscope image and the microscope image.

19. The system according to claim 18, wherein calculating the vignetting-free microscope image includes:

using a central area of the microscope image with vignetting for the calculated vignetting-free microscope image; and replacing or modifying a shaded edge area of the microscope image by a corresponding image area of the virtually stained microscope image.

20. The system according to claim 18, wherein the image processing model includes a model trained with training data comprising input images with vignetting and associated target images without vignetting to calculate the vignetting-free microscope image.

* * * * *